(12) United States Patent
Pero

(10) Patent No.: US 8,272,202 B2
(45) Date of Patent: Sep. 25, 2012

(54) GAS TURBINE ENGINE FAN VARIABLE AREA NOZZLE WITH SWIVALABLE INSERT SYSTEM

(75) Inventor: Edward B. Pero, Somers, CT (US)

(73) Assignee: United Technologies Corporation, Hartford, CT (US)

( * ) Notice: Subject to any disclaimer, the term of this patent is extended or adjusted under 35 U.S.C. 154(b) by 777 days.

(21) Appl. No.: 12/441,607

(22) PCT Filed: Oct. 12, 2006

(86) PCT No.: PCT/US2006/040249
§ 371 (c)(1),
(2), (4) Date: Mar. 17, 2009

(87) PCT Pub. No.: WO2008/045091
PCT Pub. Date: Apr. 17, 2008

(65) Prior Publication Data
US 2010/0043394 A1    Feb. 25, 2010

(51) Int. Cl.
*F02K 1/06* (2006.01)
(52) U.S. Cl. .......... 60/204; 60/226.1; 60/226.3; 60/771; 239/265.19; 239/265.25; 239/265.27
(58) Field of Classification Search .............. 60/204, 60/226.1, 226.3, 262, 771; 239/265.19, 265.25, 239/265.27
See application file for complete search history.

(56) References Cited

U.S. PATENT DOCUMENTS

| | | |
|---|---|---|
| 3,477,230 A | 11/1969 | Bauger et al. |
| 3,598,318 A * | 8/1971 | Schiel ................. 239/265.19 |
| 3,877,663 A | 4/1975 | Curran et al. |
| 3,967,443 A * | 7/1976 | McMurtry ................. 60/226.1 |
| 4,251,987 A * | 2/1981 | Adamson ................... 60/226.1 |
| 5,054,285 A | 10/1991 | Geidel et al. |
| 5,782,431 A | 7/1998 | Gal-Or et al. |
| 2004/0187476 A1 | 9/2004 | Lair |

FOREIGN PATENT DOCUMENTS

| | | |
|---|---|---|
| EP | 1191214 A2 | 3/2002 |
| GB | 2372729 | 9/2002 |

OTHER PUBLICATIONS

Search Report and Written Opinion mailed on Oct. 25, 2007 for PCT/US2006/040249.
Notification of Transmittal of the International Preliminary Report on Patentability mailed on Dec. 19, 2008 for PCT/US2006/040249.

* cited by examiner

*Primary Examiner* — Ehud Gartenberg
*Assistant Examiner* — Lorne Meade
(74) *Attorney, Agent, or Firm* — Carlson, Gaskey & Olds, P.C.

(57) ABSTRACT

A turbofan engine (10) includes a fan variable area nozzle (FVAN) (50) which effectively changes the physical area and geometry within a fan bypass flow path (40) to manipulate the pressure ratio of the bypass flow. The FVAN generally includes a multitude of aerodynamically shaped inserts (52) circumferentially located about the core nacelle (12). The FVAN at a fully stowed position (takeoff/landing) takes up a minimum of area within the fan bypass flow path to effectively maximize the fan nozzle exit area (44) while in the fully deployed position (cruise) takes up a maximum of area within the bypass flow path to effectively minimize the fan nozzle exit area. By separately adjusting each of the multiple of inserts relative the other inserts the FVAN provides an asymmetrical fan nozzle exit area to selectively vector the fan bypass flow.

18 Claims, 2 Drawing Sheets

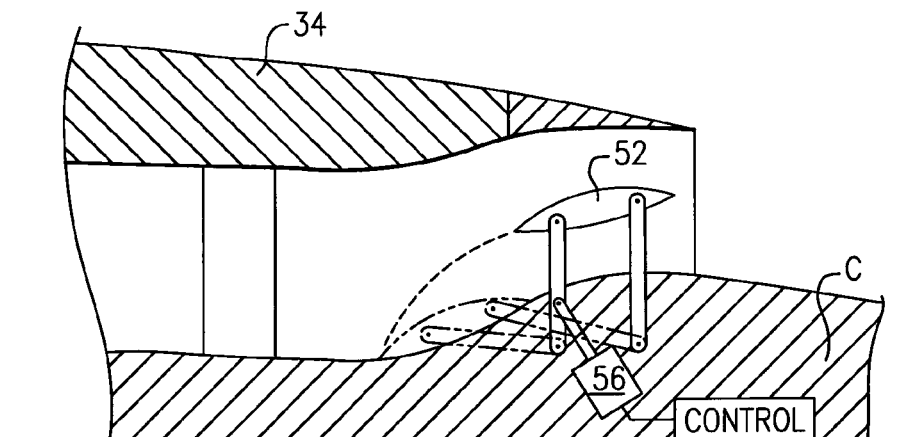
FIG.1B
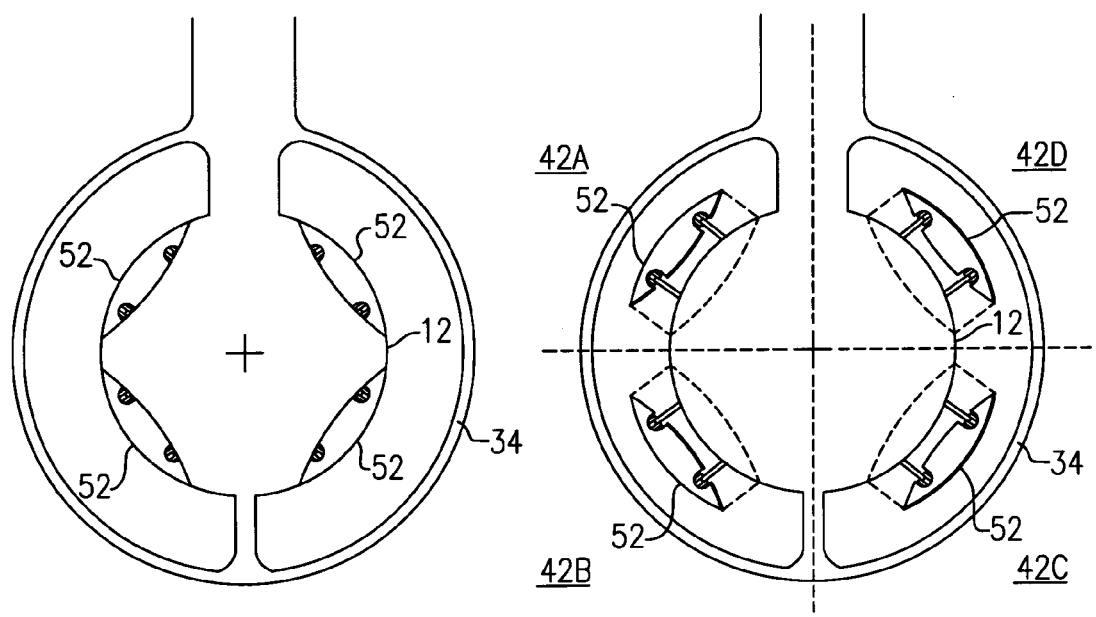
FIG.2A  FIG.2B

GAS TURBINE ENGINE FAN VARIABLE AREA NOZZLE WITH SWIVALABLE INSERT SYSTEM

BACKGROUND OF THE INVENTION

The present invention relates to a gas turbine engine, and more particularly to a turbofan engine having an insert system which swivels relative a fan bypass flow to vary the effective area of a fan nozzle exit area.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases discharged through the core exhaust nozzle.

The fan nozzles of conventional gas turbine engines have fixed geometry. The fixed geometry fan nozzles must be suitable for take-off and landing conditions as well as for cruise conditions. However, the requirements for take-off and landing conditions are different from requirements for the cruise condition. Optimum performance of the engine may be achieved during different flight conditions of an aircraft by tailoring the fan exhaust nozzle for the specific flight regimes.

Accordingly, it is desirable to provide an effective, lightweight fan variable area nozzle for a gas turbine engine.

SUMMARY OF THE INVENTION

A turbofan engine according to the present invention includes a fan variable area nozzle (FVAN) which effectively changes the physical area and geometry within a fan bypass flow path to manipulate the pressure ratio of a fan bypass flow therethrough. The FVAN generally includes a multitude of aerodynamically shaped inserts circumferentially located about the core nacelle within the fan bypass flow path.

The inserts at a fully stowed position (takeoff/landing) take up a minimum of area within the fan bypass flow path to effectively maximize the fan nozzle exit area while in the fully deployed position (cruise) take up a maximum of area within the fan bypass flow path to effectively minimize the fan nozzle exit area of the FVAN.

By adjusting the inserts symmetrically in which all inserts are moved uniformly, thrust efficiency and fuel economy are maximized during each flight condition. By separately adjusting each of the multiple of inserts relative to the other inserts the FVAN provides an asymmetrical fan nozzle exit area such that engine fan bypass flow is selectively vectored.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1B is an expanded sectional view of the engine;

FIG. 2A is a sectional view of the engine of FIG. 1A through line 2-2 of the FVAN in a closed position; and FIG. 2B is a sectional view of the engine of FIG. 1A through line 2-2 of the FVAN in a thrust vectored position.

DETAILED DESCRIPTION OF THE PREFERRED EMBODIMENT

Figure 1A:
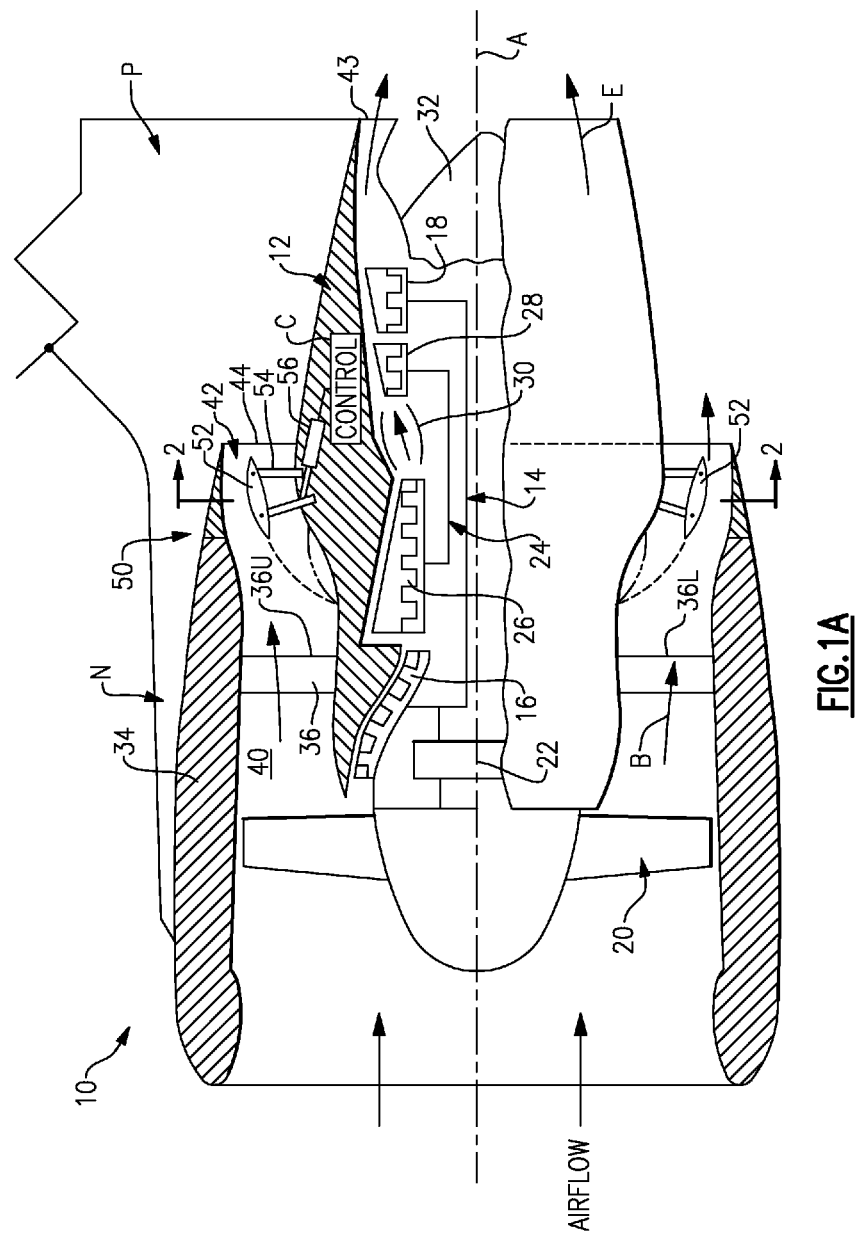
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the turbofan diameter is significantly larger than that of the low pressure compressor 16, and the low pressure turbine 18 has a pressure ratio that is greater than 5. The gear train 22 is preferably an epicycle gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by a pylon structure 36 often generically referred to as an upper bifurcation 36U and lower bifurcation 36L, however, other types of pylons at various radial locations may likewise be usable with the present invention.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular fan bypass flow path 40 and is discharged from the engine 10 through an annular fan nozzle 42 which defines a fan nozzle exit area 44 between the fan nacelle 34 and the core nacelle 12.

A significant amount of thrust is provided by the bypass flow B due to the high bypass ratio. Thrust is a function of density, velocity, and area. One or more of these parameters can be manipulated to vary the amount and direction of thrust provided by the bypass flow B. The fan section 20 of the engine 10 is preferably designed for a particular flight condition—typically cruise at 0.8M and 35,000 feet. The fan section 20 includes fan blades which are designed at a particular fixed stagger angle for an efficient cruise condition. A fan variable area nozzle (FVAN) 50 within the bypass flow B operates to change the effective area thereof.

The FVAN 50 is operated to effectively vary the fan nozzle exit area 44 to adjust fan bypass air flow such that the angle of attack or incidence on the fan blade is maintained close to design incidence at other flight conditions such as landing and takeoff, thus enabling optimized engine operation over a range of flight condition with respect to performance and other operational parameters such as noise levels.

The bypass flow B through the nozzle exit area 44 is effectively altered through articulation of the FVAN 50. That is, articulation of the FVAN 50 effectively changes the physical area and geometry of the fan bypass flow path 40 to manipulate the area through which the bypass flow B must pass. The FVAN 50 generally includes a multitude of inserts 52, with an associated linkage 54 and an actuator system 56 (also shown in FIG. 1B). Each inserts 52 is movably mounted to the core nacelle 12 through the linkage 54 in response to the actuator system 56. Preferably, the inserts 52 are circumferentially located about the core nacelle 12 (FIG. 2A). Alternatively, the inserts 52 may be mounted to the core engine structure with cut-outs in the core nacelle 12 such that the inserts 52 extend therefrom. In other words, the inserts 52 may be located at various locations adjacent the bypass flow path so long as the inserts 52 may selectively be extended to effect the bypass flow.

The inserts 52 are preferably aerodynamically shaped members located upstream of the annular fan nozzle 42 between the fan nacelle 34 and the core nacelle 12. The linkage 54 of each insert 52 is preferably driven by the actuator system 56 to move the insert 52 between a fully extended and a fully stowed position. The inserts 52 are also shaped to interface with the core nacelle 12 to provide a flush aerodynamic surface when in the stowed position. The linkage 54 also preferably orients each insert 52 in response to the bypass flow B at each of a multiple of positions such as take-off/landing, climb and cruise.

The FVAN 50 preferably provides an approximately 20% (twenty percent) effective change in the fan nozzle exit area 44. That is, the FVAN 50 at the fully deployed position (cruise) takes up a maximum area within the fan bypass flow path 40 to effectively minimize the fan nozzle exit area 44. The FVAN 50 at the fully stowed position (takeoff/landing) takes up a minimum of area within the bypass flow path 40 to effectively maximize the fan nozzle exit area 44. It should be understood that an essentially infinite number of positions intermediate the fully deployed and fully stowed position may be utilized for other flight conditions such as climb or maneuvering. It should also be understood that other insert orientations as well as thrust vectored positions in which some circumferential insets 52 of the FVAN 50 are differentially positioned relative other circumferential inserts 52 (FIG. 2B) are likewise usable with the present invention.

In operation, the FVAN 50 communicates with the controller C to effectively vary the fan nozzle exit area 44 in response to movement of the inserts 52 within the fan bypass flow path 40. Other control systems including an engine controller flight control system may likewise be usable with the present invention.

By adjusting the inserts 52 axi-symmetrically such that all inserts are moved uniformly, thrust efficiency and fuel economy are maximized during each flight condition. By separately adjusting the circumferential inserts 52 within, for example, each sectors 42A-42D (FIG. 2B) to provide an asymmetrical fan nozzle exit area 44, engine fan bypass flow is selectively vectored to provide, for example only, trim balance or thrust controlled maneuvering, enhanced ground operations or short field performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a gas turbine engine comprising:
   a core nacelle defined about an axis;
   a fan nacelle mounted at least partially around said core nacelle to define a fan bypass flow path said fan nacelle having an upstream inlet and a downstream nozzle exit area; and
   a fan variable area nozzle having multiple aerodynamically-shaped inserts movable between a stowed position in which said multiple aerodynamically-shaped inserts are aerodynamically flush with said core nacelle upstream of said nozzle exit area, in response to a landing and takeoff flight condition and a deployed position in which said multiple aerodynamically-shaped inserts are at a maximum deployed position in the downstream nozzle exit area in response to cruise flight condition to selectively vary said downstream nozzle exit area.

2. The assembly as recited in claim 1, further comprising a linkage between said aerodynamically-shaped insert and said core nacelle, said linkage defining a multiple of orientations of said aerodynamically-shaped insert.

3. The assembly as recited in claim 2, further comprising an actuator system mounted to said core nacelle to drive said linkage.

4. The assembly as recited in claim 1, wherein said fan variable area nozzle includes said multiple aerodynamically-shaped inserts movably mounted to said core nacelle, each of said multiple aerodynamically-shaped inserts forming a generally flush aerodynamic surface with said core nacelle when in said stowed position.

5. The assembly as recited in claim 1, wherein said fan variable area nozzle includes said multiple aerodynamically-shaped inserts movably mounted to said core nacelle, each of said multiple aerodynamically-shaped inserts located at a circumferential position about said core nacelle.

6. The assembly as recited in claim 1, wherein said multiple aerodynamically-shaped inserts are operable to provide at least an approximately 20% (twenty percent) effective change in the fan nozzle exit area.

7. The assembly as recited in claim 1, wherein said multiple aerodynamically-shaped inserts are each independently moveable relative said core nacelle.

8. The assembly as recited in claim 1, wherein said multiple aerodynamically-shaped inserts are arranged to move axially aft to reach the maximum deployed position.

9. The assembly as recited in claim 1, wherein said multiple aerodynamically-shaped inserts are disposed in said core nacelle and extend therefrom.

10. A gas turbine engine comprising:
- a core engine defined about an axis;
- a turbofan driven about said axis;
- a gear system driven by said core engine, said turbofan driven by said gear system about said axis;
- a core nacelle defined at least partially about said core engine;
- a fan nacelle mounted at least partially around said core nacelle to define a fan bypass flow path said fan nacelle having an upstream inlet and a downstream nozzle exit area; and
- a multiple of aerodynamically-shaped inserts movable between a stowed position in which said multiple aerodynamically-shaped inserts are aerodynamically flush with said core nacelle upstream of said nozzle exit area, in response to a landing and takeoff flight condition and a deployed position in which said multiple aerodynamically-shaped inserts are at a maximum deployed position in the downstream nozzle exit area during cruise flight condition to selectively vary said downstream nozzle exit area.

11. The engine as recited in claim 10, wherein said multiple aerodynamically-shaped inserts are each independently moveably relative said core nacelle.

12. The engine as recited in claim 11, further comprising a controller in communication with an actuator system to independently position each of said multiple aerodynamically-shaped inserts in response to a flight condition.

13. The engine as recited in claim 12, wherein said multiple aerodynamically-shaped inserts are operable to provide at least an approximately 20% (twenty percent) effective change in the fan nozzle exit area.

14. A method of varying a fan nozzle exit area of a gas turbine engine comprising the steps of:
- (A) deploying a multiple aerodynamically-shaped inserts to a deployed position within said fan nozzle exit area of a fan bypass flow path by a linkage between said multiple aerodynamically-shaped inserts and a core nacelle to selectively vary said fan nozzle exit area in response to a cruise flight condition; and
- (B) stowing the multiple aerodynamically-shaped inserts to a stowed position by the linkage between said multiple aerodynamically-shaped inserts and said core nacelle, the multiple aerodynamically-shaped inserts aerodynamically flush with a core nacelle upstream of said fan nozzle exit area in the stowed position in response to a landing and takeoff flight condition.

15. A method as recited in claim 14, wherein said step (A) further comprises:
- (a) deploying the multiple aerodynamically-shaped inserts to an intermediate position in response to a non-cruise flight condition.

16. A method as recited in claim 14, wherein said step (A) further comprises:
- (a) asymmetrically deploying one of the multiple aerodynamically-shaped inserts relative to another of the multiple aerodynamically-shaped inserts to vector a fan thrust.

17. The method of claim 14, wherein said step (A) further comprises deploying said multiple aerodynamically-shaped inserts to a deployed position in an axially aft direction relative to said core nacelle.

18. The method of claim 14, wherein a controller independently positions said multiple aerodynamically-shaped inserts during deploying of said step (A) and stowing of said step (B).

\* \* \* \* \*